R. H. WRIGHT.
WASHING AND COLLECTING APPARATUS.
APPLICATION FILED JULY 7, 1911.
1,103,390.
Patented July 14, 1914.
4 SHEETS—SHEET 1.
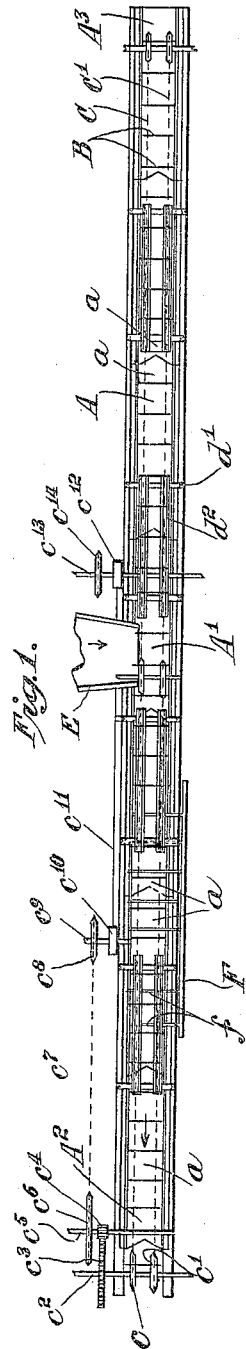
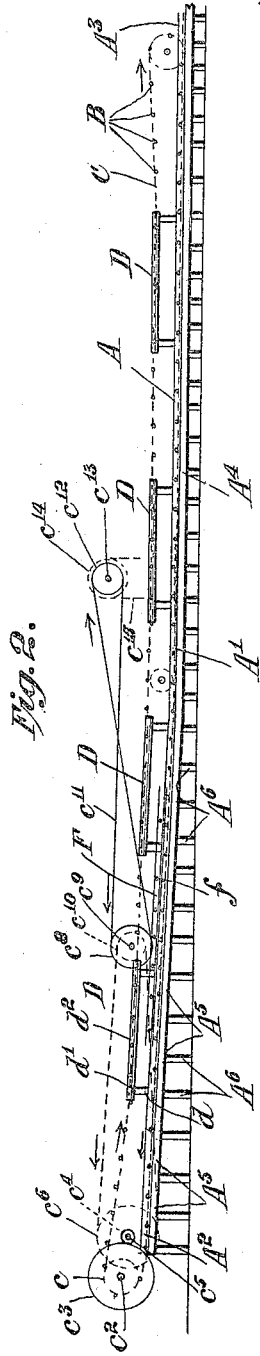
Attest:
Inventor:
Robert Hazlehurst Wright
by Rogers, Kennedy & Campbell
his Attys.

R. H. WRIGHT.
WASHING AND COLLECTING APPARATUS.
APPLICATION FILED JULY 7, 1911.
1,103,390.
Patented July 14, 1914.
4 SHEETS—SHEET 2.
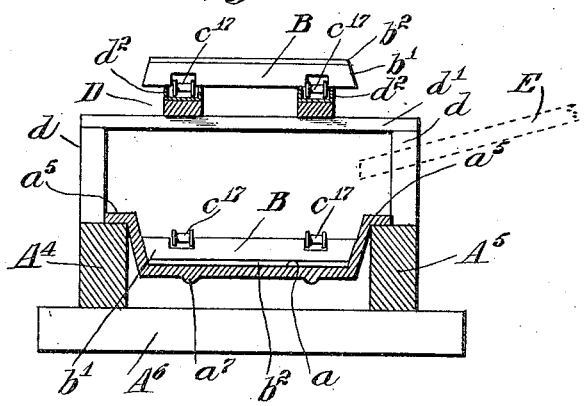
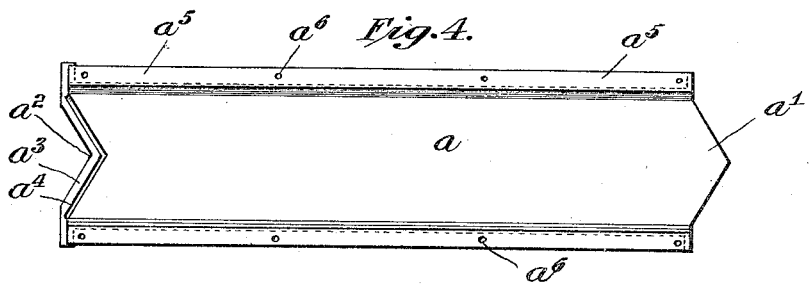
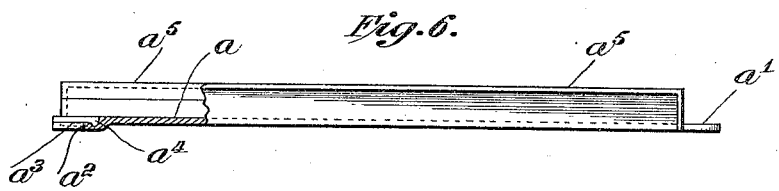

R. H. WRIGHT.
WASHING AND COLLECTING APPARATUS.
APPLICATION FILED JULY 7, 1911.
1,103,390.
Patented July 14, 1914.
4 SHEETS—SHEET 3.
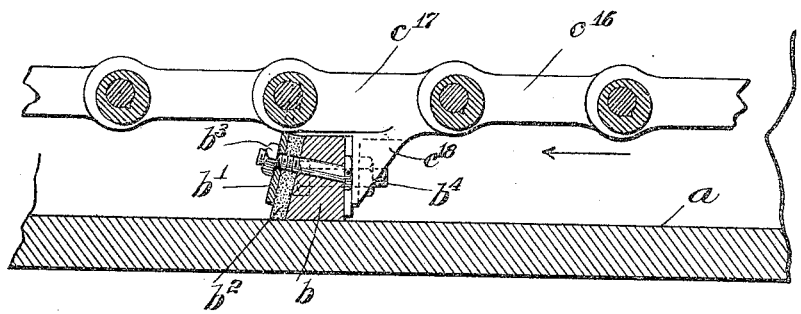
Fig. 7.
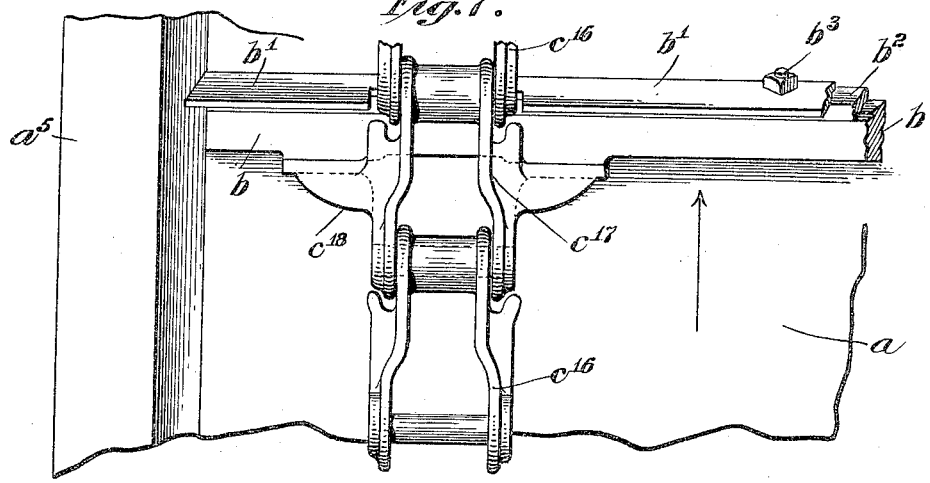
Fig. 7ª
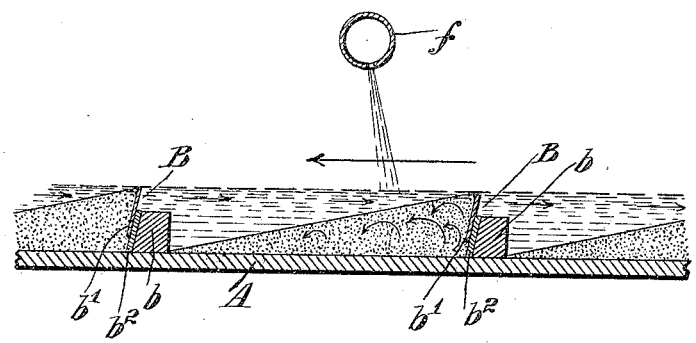
Fig. 8.
Attest:
Inventor:
Robert Hazlehurst Wright
by Rogers, Kennedy & Campbell
his Attys.

R. H. WRIGHT.
WASHING AND COLLECTING APPARATUS.
APPLICATION FILED JULY 7, 1911.
1,103,390.
Patented July 14, 1914.
4 SHEETS—SHEET 4.
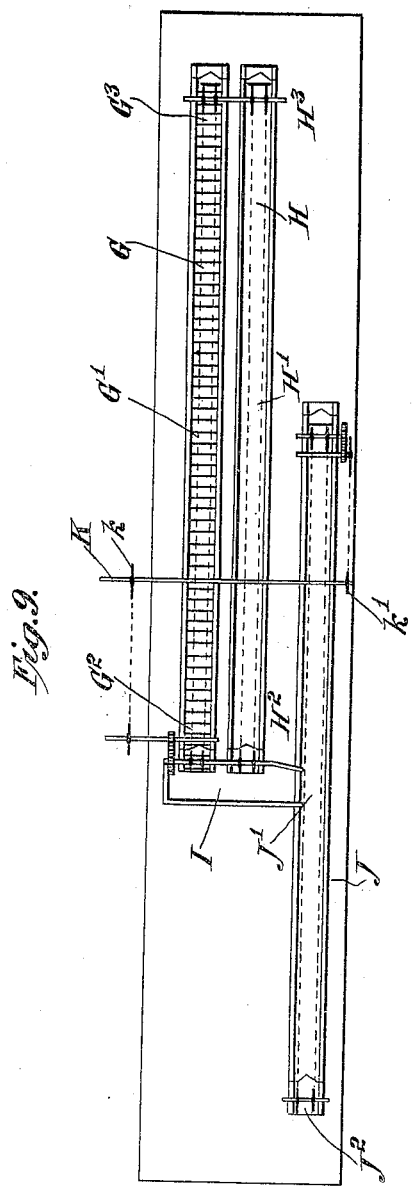
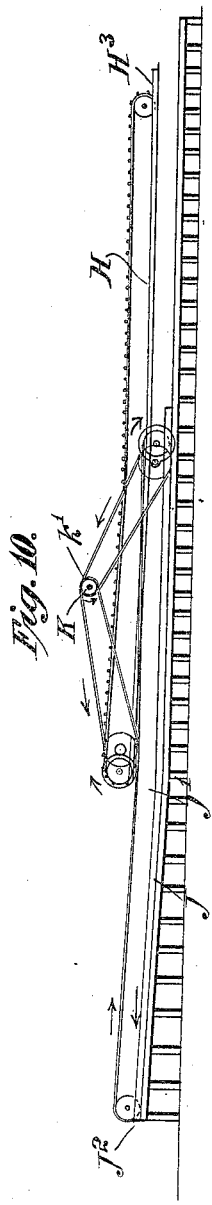
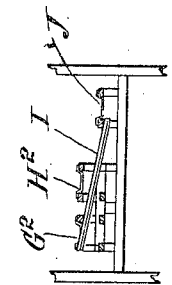
Attest:
E. O. Mitchell
E. B. Krieg
Inventor:
Robert Hazlehurst Wright
by Rogers, Kennedy & Campbell
his Attys.

UNITED STATES PATENT OFFICE.

ROBERT HAZLEHURST WRIGHT, OF NASHVILLE, TENNESSEE, ASSIGNOR TO CHARLESTON S. C. MINING & MANUFACTURING COMPANY, OF MOUNT PLEASANT, TENNESSEE, A CORPORATION OF SOUTH CAROLINA.

WASHING AND COLLECTING APPARATUS.

1,103,390.     Specification of Letters Patent.     Patented July 14, 1914.

Application filed July 7, 1911. Serial No. 637,371.

*To all whom it may concern:*

Be it known that I, ROBERT HAZLEHURST WRIGHT, a citizen of the United States, residing at Nashville, in the county of Davidson and State of Tennessee, have invented certain new and useful Improvements in Washing and Collecting Apparatus, of which the following is a specification, reference being had therein to the accompanying drawing.

My invention relates to apparatus for washing and collecting the values or other ingredients of ores, earths, sands, disintegrated rock, etc., and the apparatus hereof is intended for separating various ingredients or constituents from a body or mass of material. Thus it has been employed for washing and collecting phosphate sand and also coal, and would be available as well for any sand, kaolin or other clays or even fine ore; in each of which in a crude state there exist two or more different characters of material, the physical or chemical nature of one of them being such that it may be either soluble in water or capable of suspension in water by reason of its fine division so that with agitation the finely divided matter on the one hand or the dissolved matter may be carried or floated away with the water and separated from the other constituents of the original material.

An object of the present invention is to afford a new and improved separating apparatus capable of washing and collecting materials such as those above referred to, and more specifically speaking other objects are the improvement of the vessel or trough in which the material is separated into classes, also the means for causing the relative travel of the classes, and also the feed and control of the material and water.

The invention consists in the hereinafter described novel trough or vessel and its general construction and arrangement; also the means whereby opposite endwise discharge is secured of the heavy or coarse material at one end, and the fine or light material at the other end; also the formation of the trough or vessel in units of peculiar form enabling the apparatus to be taken apart or to be built up in any desired length according to the number of units.

The invention also consists in the hereinafter described novel means for causing the relative travel of the different classes of material including a series of moving flights, riffle bars or collectors and the chain or similar connections for driving them; also the peculiar and novel construction of the flights.

The invention also consists in the hereinafter described novel arrangement whereby a trough is provided which is of great length compared to its width and of shallow depth compared to its width, with feed near the middle of the vessel's length and discharge at the two ends; also such incline of the different longitudinal portions of the vessel as to produce a hollow or pool near the center where the water and ore may collect and from which the travel and separation is effected; also a novel arrangement of water sprays.

The invention also consists in such further novel parts, arrangements, apparatus and combinations as are hereinafter described and illustrated.

I will first describe one form of apparatus embodying my improvements and will then point out the novel features in the claims.

In the accompanying drawings forming a part hereof, Figure 1 is a top plan view of an apparatus embodying my improvements. Fig. 2 is a central longitudinal section showing part of the apparatus in side elevation. Fig. 3 is a transverse section taken through the trough and one of the overhead bridges or guides. Figs. 4, 5 and 6 show the details of the trough sections, Fig. 4 being a plan view of a section, Fig. 5 an end elevation, and Fig. 6 a side elevation. Figs. 7 and 7ª, etc., show the preferred details of construction of the flights or moving riffle bars. Fig. 8 is a longitudinal section of a fragment of the trough showing two successive flights and illustrating the action of the material. Fig. 9 shows in plan view a possible arrangement whereby two of the troughs of Figs. 1, etc., may be operated side by side and caused to both discharge into a chute leading to the center of a third trough for further washing. Fig 10 is a side elevation, and Fig. 11 an end elevation thereof.

Similar letters of reference designate corresponding parts in the several figures of the drawings.

The main trough or vessel A hereof, while it may be regulated in length, is preferably of great length as compared to its width. It is shown as made up of seven sections $a$, each of which may be ten feet long and two feet wide on the inside bottom, and the entire trough being thereby seventy feet long by two feet wide. The trough will be of shallow depth compared to its width, for example one-half foot depth inside compared to two feet width.

The details of the trough section construction will be hereinafter described and also the details of the flights, scrapers or moving collectors, as well as the mechanism for driving them, and also the control of the feed and discharge of material and water.

The trough A, which is intended to have the unwashed material fed into it at a point A' substantially midway of its ends, may be of various shapes and adjustments as regards its incline but it is preferred that the trough shall be slanted upwardly from the center toward the end $A^2$, namely the left-hand end Fig. 1, at which the discharge of one coarse or heavy material is effected. This incline is clearly seen at Fig. 2. In none of the figures is any receiving vessel shown for receiving the coarse, heavy material discharged from the trough A since the details thereof form no part of the present improvements, and the material discharged may be handled in any desired manner. In Figs. 9, 10, 11, it should be said, the discharge is into an inclined chute leading to another trough for further washing.

Hereinafter will be described the flights or collectors which are constantly moving toward the left to feed the heavy coarse material up the incline to the discharge end. Bearing this in mind it will be clearly seen that the tendency of said incline is to produce at and adjacent to the middle part of the trough length a substantial collecting pool in which both material and water will collect to a greater depth than at other portions of the length of the apparatus. To afford this pool is one of the objects of the described construction.

That part of the trough's length from the middle or feed portion A' to the right-hand end $A^3$ where the light and fine material is discharged, is shown as substantially level or flat, but this might be varied within the scope of the present improvements by introducing an incline in either direction, more particularly a slight upward incline from A' to $A^3$ thus emphasizing the formation of a collecting pool at the center. The maintenance of a central pool and the upward incline at the left tend advantageously to check the outflow of the heavy, coarse particles, thereby prolonging the washing operations upon them and increasing the effectiveness of the machine's operation.

The degree of slope of the trough at one or both ends will be subject to change in accordance with the principles well understood by those skilled in the art. A steeper incline at the discharge end $A^2$ will cause a lesser discharge of material, and the material discharged will be of a coarser, heavier nature, whereas with a lesser incline particles not so coarse and heavy will be permitted to discharge and in this way the character of the separated material can be to some extent regulated. In other words, if with a given incline it is found that too much or too little material is discharged at $A^2$ a correction will be made by altering the incline as desired. The same remarks apply to a certain extent to the right-hand or tail end where the smaller or lighter particles are discharged. The greater the up slope at that end, the more check will be afforded to the outflowing material and the better means will thereby be provided for portions of the finer material to settle and be dragged back toward the central collecting point and prevent their being wasted by discharge with the tailings. The upward incline at the left or head end of the machine possesses a further advantage in assisting the action of the water to be hereinafter described, which has to wash over the tops of the traveling flights and carry the lighter, finer material backward toward the right.

Any suitable method may be employed for supporting the long trough throughout its length; thus as best seen in Figs. 2 and 3 the overlying trough flanges are seen to rest upon two square longitudinal timbers $A^4$ in front and $A^5$ in the rear, which extend the entire length of the apparatus. These timbers $A^4$, $A^5$ are in turn supported by a series of cross timbers $A^6$, and the cross timbers $A^6$ will be at varying heights in accordance with the slope required to be given to the trough.

I will now describe the make-up of the trough and the details of the sectional portions which are combined in any desired number for building up the entire apparatus in such length as may be required. It will be understood that the several sections are secured together by the peculiar joints to be described, and that the nature of these is such that with a long apparatus different parts of the length may be given different inclines without interfering with the effectiveness and tightness of the joints. The angle between any two sections will be so slight as to be immaterial.

Fig. 4 shows one of the trough sections in top view, and end and side elevations are seen in Figs. 5 and 6. The inner sides and bottom should be smooth and may be planed to secure smoothness so as to afford an accurate fit and coöperation with the traveling flights. The joint portion of each section where it joins to the next section is shown as of a form departing from a straight transverse cross line, it being in a form produced by two inclined lines meeting at a point $a'$ at the right. The opposite end of each section of course has its contour indented forming a recess $a^2$ into which the point $a'$ of the next succeeding section enters. The metal of each section at its left end is shown as bent or dropped downwardly for the whole width of the trough, forming a depressed or offset portion $a^3$ out of line with the general plane of the section's bottom by the thickness of the metal. This as seen in Fig. 6 affords a space at $a^4$ above the off-set portion, within which space $a^4$ is accommodated the pointed end $a'$ of the next succeeding section. In this way a water-tight, secure, overlapping flush joint is afforded.

The successive sections may be fastened to each other in any suitable way, or it may be sufficient to fasten all of them to the timbers $A^4$, $A^5$, and for the latter purpose the overlying flanges $a^5$ of each trough section are provided with holes $a^6$.

In cross-section the trough and each sectional part thereof may have any desired shape and may be curved or flat-sided, it being shown as having two flat inclined sides and a flat bottom with the two supporting flanges $a^5$ already referred to.

To increase the smoothness and continuity of the inner trough surface the joints between the successive sections may be calked with such substances as lead or alloy or asphalt or mineral or vegetable compounds. If desired each trough section may have exterior stiffening ribs, such for example as the longitudinal ribs indicated at $a^7$ Fig. 3.

The series of flights B, B, which are in the nature of traveling bars or scrapers, are indicated in Figs. 1 and 2 and shown more in detail in Figs. 3, 7, 7ª, 8. They are all connected to any suitable mechanism for causing their gradual forward travel, and such travel may be either steady and continuous or jerky and intermittent. It is preferred in an apparatus of the proportions shown in the drawings, that the flights should travel at an average speed of about from forty to sixty feet per minute more or less according to the amount of washing which is required.

A convenient means for actuating the flights is a draft connection such as a chain, wire or rope or a pair of them, see chains C, C', to which all of the flights are connected so as to lie in a position transverse of the trough A. The draft connection or chains C, C' may be continuous, passing around sprockets $c$, $c'$ at the left end of the apparatus, and similar sprockets at the other end. The return length or portion of each chain C, C' should be supported to prevent its sagging into the trough, and for this purpose idler sprockets might be employed or elevated tracks, guides or bridges D, D as shown. The supporting tracks D, D need not form a continuous guide and for convenience are formed as a plurality of short elevated tracks as shown spaced near enough to each other to prevent the chain sagging objectionably between them. This construction has the advantage of rendering the apparatus more open to access and inspection and dispenses with idler sprockets and the care needed to keep them in running condition. Each elevated track-way is shown as consisting simply of two pairs of vertical supports $d$, over each pair of which rests a transverse support $d'$, the actual guides $d^2$ resting longitudinally upon the cross supports $d'$. Arrows have been applied to indicate the direction of travel, it being understood that the heavy and coarse material is discharged at the left.

For driving the sprockets $c$, $c'$ and thereby chains C, C' and the flights B, said two sprockets may be secured to a transverse shaft $c^2$ which has also secured to it a spur gear $c^3$ engaging a pinion $c^4$ on a second transverse shaft $c^5$ upon which is a sprocket $c^6$ engaged by a chain $c^7$ passing to another sprocket $c^8$ on a third transverse shaft $c^9$, said shaft also having a pulley $c^{10}$ engaged by a belt or rope $c^{11}$ that passes also about another pulley $c^{12}$ mounted on a shaft $c^{13}$ having a sprocket $c^{14}$ thereon about which engages a chain $c^{15}$ extending to any convenient source of power such as a motor. The described arrangement of driving mechanism may of course be varied to suit the circumstances and a combined driving mechanism may be employed where two or three or more apparatuses are to be operated in conjunction, as seen in Figs. 9, 10 and 11. With the above described or other driving means may be employed the below described flights and connection between flight and chain.

As seen in Fig. 3 the flight is of such shape as to substantially conform to the bottom and sides of the trough so as to fill the lower part of the trough with an approximately water-tight connection. The flight may consist of a metal bar made for example of cast iron and having sufficient weight to cause it to press by gravity toward the bottom of the trough, this action being assisted by the weight of the draft connection or chain. While a simple crossbar or scraper might in some cases be sufficient for a flight the preferred construction according to the present improvements is that the flight shall consist of not only a transverse bar preferably of metal but also a second rigid piece shown as a metal plate and the two clamped or secured together with a leather piece between them. Thus $b$ represents the main bar, $b'$ the clamping plate, $b^2$ the leather strip and $b^3$ the bolts clamping the three together. The flights may in some cases be so constructed as to make a loose fitting joint with the trough; and thus purposely allow certain material to pass underneath and around the flights. The leather piece is in the form of a strip standing inclined and extending along the front face of the bar $b$ from one side of the trough to the other, and said leather strip extends clear to the bottom so as to actually contact the trough bottom and sides as the flight is dragged along. The leather thus acts somewhat as a packing, aiding materially in securing a tight or nearly tight fit between the flights and the trough bottom and sides. Any well known means may be employed for connecting the flights B at intervals along the sprocket chains C, C'. For example the ordinary links $c^{16}$ may at regular intervals be replaced by special links $c^{17}$ formed with integral extensions $c^{18}$ which are perforated to correspond with holes in the bars $b$, whereby bolts $b^4$ may be employed for securing them together. The above described flight construction is of material advantage in increasing the efficiency of the apparatus.

I will now describe the feeding and discharging of the ore, sand or other material and the water.

The material may be fed in any desired manner to the trough and to assist the feeding an inclined chute E may be employed shown located near the center of the length of the trough. Material dumped into this will pass into the trough where it will at once mix with the water and other material there collected and will be subject at once to the action of the flights or scrapers, which are dragging always from right to left. It will be understood that the heavier and coarser materials will sink and be more directly subject to the forward motion of the flights than will the soluble and lighter matters which latter together with the excess of water will be more or less free from the operation of the flights and will be able to flow toward the right so as eventually to discharge the lighter materials at the right-hand end $A^3$ of the trough. In the meantime the heavier materials becoming more and more cleanly washed, are fed toward the discharge end $A^2$.

Water may be admitted in any desired manner but I prefer that it should be admitted in the form of sprays and that these sprays should be located more particularly so as to be directed upon the outgoing heavier materials, although sprays might be employed toward the discharge end $A^3$ of the apparatus, and indeed might be employed in some cases to advantage throughout the entire length of the trough. In the drawings is shown a water pipe F extending alongside of the trough at a convenient point between the central portion A' and the discharge end $A^2$ of the trough. Leading from the water pipe F are shown eight spray pipes $f$ each extending directly over the trough and having spray apertures directed downwardly so that the force of the spray is received by the materials to be washed. This adds materially to the washing effect and also tends better to break up the material, and at the same time affords a liquid flow in that part of the apparatus for carrying back toward the tail end the lighter and finer particles which it is desired to separate. The use of the sprays at this point is also important in assisting the action of the flights whose forward motion imparts rolling and sliding riffle movements to the material, such movements being increased and rendered more effective by the sprays and constituting an important factor in effecting the complete washing of the material.

The actions caused by the flight movements and the sprays, and the agitation created by the latter are roughly illustrated in Fig. 8 in which the large arrow shows the direction of movement of the flights and of the heavy coarse material, while the small arrows show the backward flow of the water, overflowing the flights and carrying the light material with it. The spray pipe $f$ may have small holes in its lower side with a heavy water pressure, for example sixty pounds per square inch, causing forcible jets of water upon the material. Just forward of each flight is shown a triangular mass of sand including coarse and heavy material under the influence of the agitation of the jets of water from above. The curved arrows within the mass are intended to indicate the nature of the agitation, which is quite thorough, the lower portions of the material being constantly forced upwardly so that there is a continual intermingling and full opportunity for clean washing and removal of all the lighter and finer particles including muddy substances such as clay and soluble substances, all of which are removed and overflow with the water passing to the left.

There is a species of riffle effect in the action of the flights in that the angle between the flight and the trough is enabled to catch the coarse, heavy materials. There is also a very advantageous scouring of the material effected owing to the rubbing of the material along the bottom of the trough.

Regulation is easily secured of the degree of washing and of the relative fineness of the discharges at the head and tail ends. Such regulation may be effected by controlling the quantity of material fed into the apparatus and the amount of water sprayed into it; the speed of the flights is also important and may be altered to suit conditions. The incline of the trough at the head end and also at the tail end may be altered to afford further control. All of these different factors may be adjusted in accordance with the nature of the material being worked upon. The apparatus is therefore very elastic and adaptable in its uses, besides possessing great efficiency, simplicity and reliability, cheapness in first cost and in maintenance and durability.

Figs. 9, 10 and 11 are incomplete as to the showing of the flights and their connections, but are sufficiently full to diagrammatically illustrate one manner of making a three-fold employment of the improvements hereof. Referring briefly to said figures, G represents an apparatus similar to that of Figs. 1 to 8, G' being the middle or feed portion, $G^2$ the higher end constituting the discharge for the heavy material, and $G^3$ the discharge end for the lighter materials. Parallel with this is a second similar apparatus H having the feed and discharge points H', $H^2$, $H^3$. The discharges from both $G^2$ and $H^2$ are caused to pass into a common chute I which is set at an incline and leads to where at its downward end it discharges into the middle or feed portion J' of a third apparatus J which is similar to G, H, but is off-set lengthwise as indicated. The discharge $J^2$ at the left of apparatus J directs the heavy material which has now been twice washed into any suitable receptacle. A single driving shaft K may be employed for actuating the chains of the three apparatuses G, H, J, it having a sprocket wheel $k$ with chain connections to other sprockets and shafts analogous to those shown in Figs. 1 and 2 for driving the chains and flights of apparatuses G and H, and the common shaft K has a second sprocket wheel $k'$ having chain connections for the apparatus J.

The further details of the connections will be similar to Figs. 1 to 3 and need not be further described.

Since the specific details above described are not in all cases essential, and may be altered or replaced, and since the apparatus as a whole is capable of readaptation and perfection in many ways, I do not wish to limit myself to specific features except as recited in the claims.

What I claim and desire to secure by Letters Patent is:

1. In an apparatus of the kind described, the combination of a longitudinally arranged trough, and traveling members shallower than the trough for causing travel and discharge of heavy or coarse material at the head end, said trough being arranged with an upward incline at the head end and without such incline at the other end, means to feed to an intermediate portion of the trough the material to be separated, and means for supplying a separating current of water through the trough.

2. In an apparatus of the kind described, the combination of a longitudinally arranged trough and traveling members shallower than the trough for causing travel and discharge of heavy or coarse material at the head end, said trough being arranged with an incline to cause liquid and materials carried by it to discharge at the other or tail end, such incline being upward from the trough middle toward its head end and said trough being substantially level elsewhere, means to feed to an intermediate portion of the trough the material to be separated, and means for supplying a separating current of water through the trough.

3. In an apparatus of the kind described, the combination of a long shallow trough with a series of movable flights therein, means for causing the flights to move in one direction, and means for causing a portion of the material to travel in an opposite direction, each flight comprising a rigid cross-bar adapted to rest upon the trough bottom while traveling, a piece of packing material shaped to conform to the trough's bottom in size, and means to secure said packing material to said cross-bar.

4. In an apparatus of the kind described, the combination of a long shallow trough with a series of movable flights therein, a draft connection for causing the flights to travel in one direction, means for causing a portion of the material to travel in an opposite direction, each flight comprising a rigid cross-bar, a piece of packing material in front of said cross-bar, and a clamp plate in front of said packing material, said clamp plate adapted to be rigidly clamped to the cross-bar, and said clamp plate shaped and arranged to extend substantially above said cross-bar and at least as high as said draft connection, and recessed to accommodate the latter.

In testimony whereof I affix my signature in presence of two witnesses.

ROBERT HAZLEHURST WRIGHT.

Witnesses:
E. W. FAUCETTE,
JAMES A. BARR.